United States Patent
Needham et al.

(10) Patent No.: US 6,788,941 B2
(45) Date of Patent: Sep. 7, 2004

(54) METHOD AND APPARATUS FOR MOBILE-INITIATED, CDMA-DISPATCH SOFT HANDOFF

(75) Inventors: Michael L. Needham, Palatine, IL (US); Timothy J. Wilson, Rolling Meadows, IL (US); Leigh M. Chinitz, Wellesley, MA (US)

(73) Assignee: Motorola, Inc., Schaumburg, IL (US)

( * ) Notice: Subject to any disclaimer, the term of this patent is extended or adjusted under 35 U.S.C. 154(b) by 215 days.

(21) Appl. No.: 10/027,041

(22) Filed: Dec. 20, 2001

(65) Prior Publication Data

US 2003/0119513 A1 Jun. 26, 2003

(51) Int. Cl.⁷ .............................................. H04Q 7/20
(52) U.S. Cl. ....................................... 455/442; 455/437
(58) Field of Search ............................ 455/436, 437, 455/438, 439, 442, 445, 518, 519; 370/331, 332, 335, 342, 441, 320, 322

(56) References Cited

U.S. PATENT DOCUMENTS

| | | |
|---|---|---|
| 5,056,109 A | 10/1991 | Gilhousen et al. |
| 5,216,692 A | 6/1993 | Ling |
| 5,257,183 A | 10/1993 | Tam |
| 5,265,119 A | 11/1993 | Gilhousen et al. |
| 5,267,262 A | 11/1993 | Wheatley, III |
| 5,323,452 A | 6/1994 | Dickman et al. |
| 5,383,219 A | 1/1995 | Wheatley, III et al. |
| 5,448,752 A * | 9/1995 | Mabey ........................ 455/518 |
| 5,485,486 A | 1/1996 | Gilhousen et al. |
| 5,548,808 A | 8/1996 | Bruckert et al. |
| 5,590,177 A | 12/1996 | Vilmur et al. |
| 5,613,209 A | 3/1997 | Peterson et al. |
| 5,621,723 A | 4/1997 | Walton, Jr. et al. |
| 5,691,979 A | 11/1997 | Cadd et al. |
| 5,711,011 A | 1/1998 | Urs et al. |
| 5,797,097 A | 8/1998 | Roach, Jr. et al. |
| 5,852,781 A | 12/1998 | Ahvenainen |
| 5,878,038 A | 3/1999 | Willey |
| 5,881,058 A | 3/1999 | Chen |
| 5,881,368 A | 3/1999 | Grob et al. |
| 5,887,252 A | 3/1999 | Noneman |
| 5,914,958 A | 6/1999 | Chinitz et al. |
| 5,920,549 A | 7/1999 | Bruckert et al. |
| 5,956,641 A | 9/1999 | Bruckert et al. |
| 5,960,356 A | 9/1999 | Alperovich et al. |
| 5,987,012 A | 11/1999 | Bruckert et al. |
| 6,005,848 A | 12/1999 | Grube et al. |
| 6,038,450 A * | 3/2000 | Brink et al. ................. 455/442 |
| 6,058,308 A | 5/2000 | Kallin et al. |
| 6,108,548 A * | 8/2000 | Furukawa et al. .......... 455/442 |
| 6,115,388 A | 9/2000 | Chinitz et al. |
| 6,167,269 A * | 12/2000 | Kondo ........................ 455/437 |
| 6,169,906 B1 | 1/2001 | Bruckert |
| 6,178,166 B1 | 1/2001 | Wilson et al. |
| 6,181,685 B1 | 1/2001 | Chinitz et al. |
| 6,188,767 B1 | 2/2001 | Needham et al. |
| 6,216,003 B1 * | 4/2001 | Hamajima et al. .......... 455/437 |
| 6,233,461 B1 | 5/2001 | Chinitz et al. |
| 6,333,921 B1 | 12/2001 | Grube et al. |
| 6,487,409 B2 * | 11/2002 | Qing-An ..................... 455/436 |

FOREIGN PATENT DOCUMENTS

| | | |
|---|---|---|
| EP | 0 828 355 A2 | 3/1998 |
| WO | WO 99/22478 A1 | 5/1999 |

* cited by examiner

*Primary Examiner*—Jean Alland Gelin
(74) *Attorney, Agent, or Firm*—Jeffrey K. Jacobs

(57) ABSTRACT

To address the need for an apparatus and method for CDMA-dispatch soft handoff, the present invention enables mobile-initiated soft handoff for dispatch calls. A mobile station (120) in a dispatch call establishes an individual inbound link (137) with the serving base site (111). When the mobile station determines that a handoff with an adjacent site (112) is needed, the mobile station uses its individual inbound link to request a soft handoff with the adjacent base site. After notifying the adjacent base site, the serving base site then transmits the handoff information to the mobile station to enable the mobile station to begin a soft handoff with the adjacent site.

24 Claims, 2 Drawing Sheets

METHOD AND APPARATUS FOR MOBILE-INITIATED, CDMA-DISPATCH SOFT HANDOFF

CROSS-REFERENCE TO RELATED APPLICATION

This application is related to the following co-pending applications all filed on even date herewith, all assigned to the assignee of the present application, and all hereby incorporated by reference into the present application: "METHOD AND APPARATUS FOR BASE-INITIATED, CDMA-DISPATCH SOFT HANDOFF," "METHOD AND APPARATUS FOR CDMA-DISPATCH SOFT HANDOFF," "METHOD AND APPARATUS FOR QUICKLY ESTABLISHING A CDMA DISPATCH CALL," and "BASE SITE AND METHOD FOR QUICKLY ESTABLISHING A CDMA DISPATCH CALL."

FIELD OF THE INVENTION

The present invention relates generally to the field of wireless communications, and more particularly, to code division multiple access (CDMA) communication systems and dispatch group call communication systems.

BACKGROUND OF THE INVENTION

A typical dispatch two-way radio communication system comprises communication units, communication resources, communication sites, and a communication resource allocator. Each of the sites has a substantially distinct coverage area and is geographically located throughout the system. Each site also has a number of communication resources assigned to it, where at least one of the communication resources is used as a control channel, while a number of the remaining communication resources are used as voice channels. Such systems are known to use both frequency division multiplex access (FDMA) and time division multiple access (TDMA) methods to rebroadcast transmissions.

The communication units are typically arranged into communication groups (talkgroups) and may be located anywhere within the system (in any site). When a communication unit of a talkgroup requests a group call, it transmits, via a control channel of the site in which it is located, an inbound signaling message to the communication resource allocator. (A group call typically allows all members of the same talkgroup that are located within the system to communicate with each other.) The inbound signaling message generally comprises the requesting communication unit's individual identification number, the requesting communication unit's talkgroup, and a request for a group call. Upon receiving the inbound signaling message, the communication resource allocator will allocate a voice channel in each site to the requesting communication unit's talkgroup.

Thus, in FDMA and TDMA dispatch systems a forward link is established (one in each site where communication units are present) and monitored by all units involved in the group call in that site, and a single reverse link which is used by the group member who is currently transmitting to the other members. Non-transmitting talkgroup members are typically in a listen only mode (i.e., not able to transmit when another member is talking) and thus are not allocated a dedicated reverse link. In a TDMA system, for example, time slots are allocated to different users. A talkgroup member transmitting on an assigned reverse link, is allowed to use full power transmission to support short bursts of signals in allocated time slots. Despite the discontinuous or discrete nature of this approach, the listener receives what appears a continuous service.

In the last decade, in response to an ever-accelerating worldwide demand for mobile and personal portable communications, spread spectrum digital technology, of which one type is known as CDMA, has achieved much higher bandwidth efficiency for a given wireless spectrum allocation, and hence has proved to be an excellent alternative for serving large populations of multiple access users, than analog or other digital technologies. CDMA relies on processing power to extract a coded signal embedded across a broad frequency spectrum. The only way to extract the wanted signal from among many other overlaid unwanted signals is to have the right code. The use of coding allows more channels to be derived by the overlaying of carriers one over another and greatly enhances performance in terms of derived channels per hertz of bandwidth.

CDMA is well suited for cellular communications, but has never been employed in a conventional dispatch system. Unlike conventional dispatch systems, CDMA systems require soft handoff at cell (site) boundaries. During a soft handoff, a communication unit, or mobile station (MS), receives the call transmission from multiple cells simultaneously until it completes the soft handoff. Employing CDMA in a conventional dispatch system requires a solution to the problem of providing soft handoff for multiple MSs that are participating in the dispatch call. Therefore, a need exists for an apparatus and method for CDMA-dispatch soft handoff.

DESCRIPTION OF A PREFERRED EMBODIMENT

To address the need for an apparatus and method for CDMA-dispatch soft handoff, the present invention enables mobile-initiated soft handoff for dispatch calls. A mobile station in a dispatch call establishes an individual inbound link with the serving base site. When the mobile station determines that a handoff with an adjacent site is needed, the mobile station uses its individual inbound link to request a soft handoff with the adjacent base site. After notifying the adjacent base site, the serving base site then transmits the handoff information to the mobile station to enable the mobile station to begin a soft handoff with the adjacent site.

Figure 1:
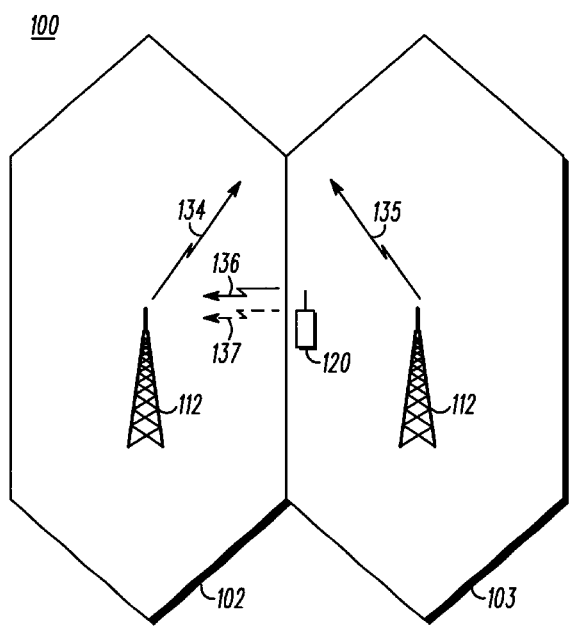
FIG. 1 is a block diagram depiction of a communication system in accordance with a preferred embodiment of the present invention.
Figure 2:
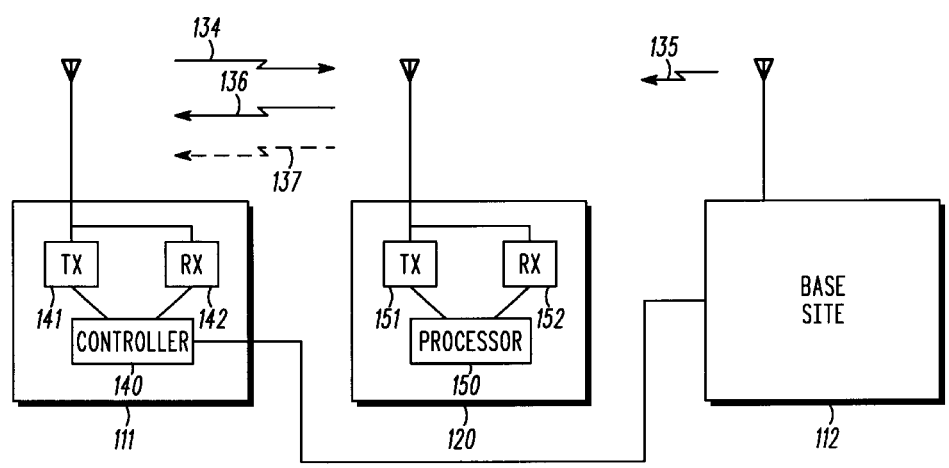
FIG. 2 is a block diagram depiction of base sites and a mobile station (MS) from the communication system of FIG. 1 in accordance with a preferred embodiment of the present invention.

The present invention can be more fully understood with reference to FIGS. 1–4, wherein like numerals designate like components. FIG. 1 is a block diagram depiction of communication system 100 in accordance with a preferred embodiment of the present invention. The wireless communication system 100 is a suitably modified CDMA system, such as a Wideband Spread Spectrum Digital Cellular System in accordance with, for example, the Telecommunications Industry Association/Electronic Industries Association Interim Standard 95 (EIA/TIA IS-95) as known in the art. System 100 comprises a plurality of communication units, although only communication unit 120 is illustrated in FIGS. 1 and 2 for simplicity. In the preferred embodiment, each of the communication units is physically capable of duplex communications, although during typical group communications, only a single communication unit is transmitting at a time.

The fixed infrastructure comprises those elements normally required to support communications within wireless system 100 and, in the preferred embodiment, conforms to a typical CDMA architecture. In particular, the wireless CDMA communication infrastructure comprises well-known components such as base sites 111 and 112 and their respective service coverage areas 102 and 103. In practice, the base sites 111 and 112 typically communicate with each other and with one or more base site controllers, a switch, and additional well-known infrastructure equipment not shown. To illustrate the present invention simply and concisely, the communication infrastructure has been limited to that shown in FIG. 1.

FIG. 2 is a block diagram depiction of base sites 111 and 112 and mobile station (MS) 120 in accordance with a preferred embodiment of the present invention. (The widely-used, term-of-art, "mobile station," is used interchangeably with "communication unit" throughout this description.) Base site 111 comprises transmitter 141, receiver 142, and controller 140. Base sites in general and base site transmitters, receivers, and controllers in particular are well known in the art. Controller 140 preferably comprises one or more memory devices and processing devices such as a microprocessor and a computer memory. In the preferred embodiment, under the control of software/firmware algorithms stored in the memory devices of base site 111, base site 111 performs those tasks required for well-known base site operation and, additionally, the method described relative to FIG. 3.

Communication unit 120 comprises a common set of elements. In particular, processor 150, which typically comprises one or more processing devices (e.g., microprocessors, digital signal processors, etc.) and memory devices, is coupled to transmitter 151 and receiver 152. Each of these elements is well known in the art. In the preferred embodiment, under the control of software/firmware algorithms stored in the memory devices of MS 120, MS 120 performs those tasks required for well-known MS operation and, additionally, the method described relative to FIG. 4.

CDMA communication channels 134–137 are effectively provided through the use of codes using well-known techniques, e.g., through a combination of orthogonal Walsh codes and pseudorandom noise (PN) sequences. In the preferred embodiment, channels 134–135 comprise full-rate outbound traffic channels transmitted by base sites 111–112, respectively. Preferably, channel 136 is an inbound access channel on which any mobile station (MS) in the system may signal base site 111. Lastly, channel 137 is a low-rate inbound link used by an individual MS to communicate forward power control information, soft handoff information, and/or reverse power information. The use of this link is described at length in U.S. Pat. No. 5,914,958, entitled "FAST CALL SETUP IN A CDMA DISPATCH SYSTEM," and U.S. Pat. No. 6,115,388, entitled "ESTABLISHMENT OF MULTIPLE LOW-RATE INBOUND SIGNALING LINKS IN CDMA DISPATCH SYSTEM," both of which are hereby incorporated by reference.

Operation of a preferred communication system 100 occurs substantially as follows. When a dispatch call is initiated, full-rate CDMA outbound traffic channel 134 is established by base site 111 and used to begin transmitting the dispatch call to MSs 120. Preferably, after beginning to receive the call via channel 134, MS 120 transmits a request to base site 111 via access channel 136 to establish a low-rate inbound link with base site 111. Inbound link 137 is thus established. This low-rate inbound link is established in accord with the description in U.S. Pat. No. 5,914,958 or alternatively with the description in U.S. Pat. No. 6,115,388, both referred to above.

Assume that while receiving the dispatch call, MS 120 is moving toward base site 112. As it moves away from base site 111, MS 120 will be requesting base site 111 to increase the transmit power of channel 134. MS 120, having monitored a pilot signal of base site 112 and perhaps other base sites, determines that a soft handoff is needed and that base site 112 is the most desirable target. To this point, this soft handoff determination process is well-known in IS-95 cellular CDMA systems.

Having determined that base site 112 is a desirable soft handoff target, MS 120 transmits via low-rate inbound link 137 a request to base site 111 to begin a soft handoff with base site 112. Base site 111 receives the request and notifies base site 112 via an interconnecting infrastructure network of MS 120's desire to begin a soft handoff. To support the soft handoff, base site 112 establishes full-rate CDMA outbound traffic channel 135, begins transmitting the dispatch call in progress, and responds to base site 111 with an indication of channel 135's availability for soft handoff. Base site 111, in turn, communicates to MS 120 the identity and availability of channel 135 for soft handoff to base site 112. Preferably, base site 111 transmits both the CDMA code used for channel 135 and the pseudorandom noise scrambling code offset that base site 112 uses. Together, the code and the offset, identify channel 135 and base site 112 to MS 120. In addition, base site 111 may also indicate the identity of MS 120 as a means to address the indication to MS 120.

To notify MS 120 of channel 135's availability for soft handoff, base site 111 preferably uses in-band signaling on channel 134 to indicate the identity of channel 135 and base site 112. In an alternative embodiment however, base site 111 could instead use a paging channel to convey the information. Specifically, base site 111 could transmit an individual page to MS 120 or a broadcast page that conveys the identity and availability of channel 135 at base site 112. If a broadcast page is used it could also include a talkgroup ID to direct the page to the talkgroup involved in the dispatch call. All the MSs in the dispatch call who are simultaneously scanning the paging channel could thus receive the soft handoff information needed by MS 120. Upon receiving an indication of channel 135's availability, whether by in-band signaling or paging, MS 120 may then begin a soft handoff with base site 112 by simultaneously receiving the dispatch call via channels 134 and 135. MS 120 may also transmit a request to establish an inbound link, like link 137, with base site 112 for the dispatch call.

Figure 3:
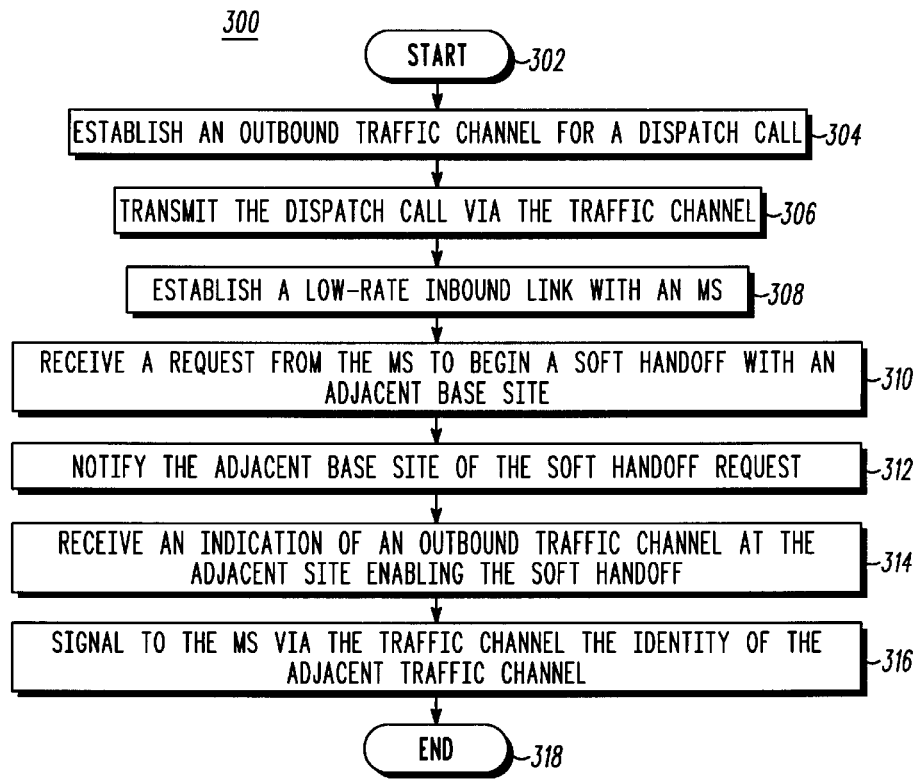
FIG. 3 is a logic flow diagram of steps executed by a base site in accordance with a preferred embodiment of the present invention.

FIG. 3 is a logic flow diagram of steps executed by a base site in accordance with a preferred embodiment of the present invention. Logic flow 300 begins (302) as a dispatch call is being set up by the base site. The base site preferably establishes (304) a full-rate outbound traffic channel on which to transmit (306) the dispatch call to an MS in the base site's coverage area. The base site also establishes (308) a low-rate inbound link for the dispatch call with the MS upon receiving a request from the MS.

When the MS determines that it needs a soft handoff to maintain the dispatch call, the MS sends a request to the base site requesting a soft handoff with a particular adjacent base site. The base site receives (310) this request and notifies (312) the adjacent base site of the MS's soft handoff request. Assuming that the adjacent base site has the channel resources available to allocate a new outbound traffic channel or that the adjacent site already has a traffic channel conveying the dispatch call, the base site will receive (314) an indication that an outbound traffic channel at the adjacent base site is available for soft handoff. The base site then signals (316) the MS preferably indicating the CDMA code that identifies the adjacent site channel and indicating the PN offset that identifies the adjacent base site to enable the MS to begin a soft handoff with the adjacent base site. Thus, logic flow 300 ends (318).

Figure 4:
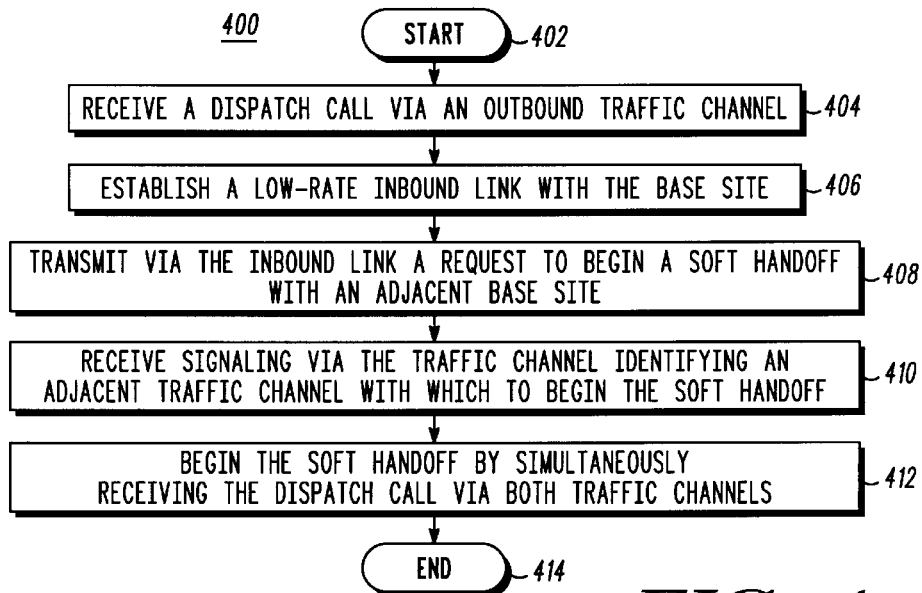
FIG. 4 is a logic flow diagram of steps executed by a mobile station in accordance with a preferred embodiment of the present invention.

FIG. 4 is a logic flow diagram of steps executed by a mobile station in accordance with a preferred embodiment of the present invention. Logic flow 400 begins (402) when the MS begins to receive (404) a dispatch call via an outbound traffic channel from a base site. The MS establishes (406) a low-rate inbound link with the base site by requesting such a link from the base site. When during the dispatch call the MS determines that a soft handoff is needed and that an adjacent base site is a desirable handoff target, the MS uses the inbound link to transmit (408) a request for a soft handoff with the adjacent base site. (In an alternative embodiment, however, this request may comprise a signal strength report, and the decision whether a soft handoff should be initiated would be made by the infrastructure.)

In response to the request, the MS preferably receives (410) the CDMA code that identifies an adjacent site channel and the PN offset that identifies the adjacent base site. With this handoff information, the MS is then able to begin (412) a soft handoff with the adjacent base site by simultaneously receiving the dispatch call via the original traffic channel and the adjacent base site traffic channel. Thus, logic flow 400 ends (414).

While the present invention has been particularly shown and described with reference to particular embodiments thereof, it will be understood by those skilled in the art that various changes in form and details may be made therein without departing from the spirit and scope of the present invention.

What is claimed is:

1. A method for a base site to facilitate mobile-initiated, CDMA-dispatch soft handoff comprising the steps of:
    establishing, by the base site, a first outbound link for a dispatch call;
    transmitting, by the base site, the dispatch call via the first outbound link;
    establishing, by the base site, an inbound link with a mobile station (MS) for the dispatch call;
    receiving, by the base site from the MS via the inbound link, a request to begin a soft handoff with an adjacent base site;
    notifying the adjacent base site of the soft handoff request of the MS;
    receiving, by the base site in response to the request to begin a soft handoff from the MS, an indication of a second outbound link at the adjacent site enabling the soft handoff; and
    indicating, by the base site, to the MS the identity of the second outbound link.

2. The method of claim 1 wherein the inbound link comprises a low-rate inbound link used to communicate at least one of forward power control information and reverse power information.

3. The method of claim 1 wherein the first outbound link and the second outbound link each comprises a full-rate CDMA outbound traffic channel.

4. The method of claim 1 wherein the step of indicating comprises the step of signaling in-band on the first outbound link the identity of the second outbound link.

5. The method of claim 1 wherein the step of indicating comprises the step of signaling via a paging channel the identity of the second outbound link.

6. The method of claim 5 wherein the step of signaling via a paging channel comprises the step of transmitting a broadcast page to convey the identity of the second outbound link.

7. The method of claim 1 further comprising the step of indicating the identity of the first MS with the identity of the second outbound link.

8. The method of claim 1 further comprising the step of indicating the identity of the adjacent base site with the identity of the second outbound link.

9. The method of claim 8 wherein the step of indicating the identity of the adjacent base site with the identity of the second outbound link comprises transmitting to the MS a pseudorandom noise scrambling code offset of the adjacent base site.

10. The method of claim 1 wherein the step of indicating to the MS the identity of the second outbound link comprises transmitting to the MS a CDMA code used for the second outbound link.

11. A method for a mobile station (MS) to initiate a CDMA-dispatch soft handoff comprising the steps of:
    receiving a dispatch call via a first outbound link with a base site;
    establishing an inbound link with the base site for the dispatch call;
    transmitting via the inbound link a request to begin a soft handoff with an adjacent bass site; and
    receiving, from the base site in response to the request to begin a soft handoff, an indication of the identity of a second outbound link at the adjacent site with which to begin the soft handoff.

12. The method of claim 11 further comprising the step of beginning the soft handoff by simultaneously receiving the dispatch call via the first outbound link and the second outbound link.

13. The method of claim 12 further comprising the step of transmitting a request to establish an inbound link with the adjacent base site for the dispatch call.

14. The method of claim 11 wherein the step of receiving the indication comprises the step of receiving in-band signaling on the first outbound link that conveys the identity of the second outbound link.

15. The method of claim 11 wherein the step of receiving the indication comprises the step of receiving a broadcast page that conveys the identity of the second outbound link.

16. The method of claim 11 wherein the request comprises a signal strength report.

17. A base site comprising:
    a transmitter;
    a receiver; and
    a controller, coupled to the transmitter and the receiver, adapted to establish a first outbound link for a dispatch call, adapted to instruct the transmitter to transmit the dispatch call via the first outbound link, adapted to establish an inbound link with a mobile station (MS) for the dispatch call, adapted to receive using the receiver a request to begin a soft handoff with an adjacent base she from the MS via the inbound link, adapted to notify the adjacent base site of the soft handoff request of the MS, adapted to receive, in response to the request to begin a soft handoff from the MS, an indication of a second outbound link at the adjacent site enabling the soft handoff, and adapted to instruct the transmitter to transmit to the MS an indication of the identity of the second outbound link.

18. The base site of claim 17 wherein the inbound link comprises a low-rate inbound link used for communicate at least one of forward power control information and reverse power information.

19. The base site of claim 17 wherein the first outbound link and the second outbound link each comprises a full-rate CDMA outbound traffic channel.

20. The base site of claim 17 wherein the controller instructs the transmitter to transmit signaling in-band on the first outbound link to convey the identity of the second outbound link.

21. The base site of claim 17 wherein the controller instructs the transmitter to transmit a broadcast page via the paging channel to convey the identity of the second outbound link.

22. A mobile station (MS) comprising:

a transmitter;

a receiver; and a processor, coupled to the transmitter and the receiver, adapted to instruct the receiver to receive a dispatch call via a first outbound link with a base site, adapted to establish an inbound link with the base site for the dispatch call, adapted to instruct the transmitter to transmit via the inbound link a request to begin a soft handoff with an adjacent base site, and adapted to receive, from the base site using the receiver and in response to the request to begin a soft handoff, an indication of the identity of a second outbound link at the adjacent site with which to begin the soft handoff.

23. The MS of claim 22 wherein the processor is further adapted to instruct the receiver to begin the soft handoff by simultaneously receiving the dispatch call via the first outbound link and the second outbound link.

24. The MS of claim 22 wherein the processor is further adapted to instruct the transmitter to transmit a request to establish an inbound link with the adjacent base site for the dispatch call.

* * * * *